(12) United States Patent
Ross et al.

(10) Patent No.: US 12,534,197 B2
(45) Date of Patent: *Jan. 27, 2026

(54) ELECTRIC TILTROTOR AIRCRAFT

(71) Applicant: Textron Innovations Inc., Providence, RI (US)

(72) Inventors: Brent C. Ross, Flower Mound, TX (US); Kirk L. Groninga, Keller, TX (US); Steven R. Ivans, Ponder, TX (US); Jason Paul Hurst, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/040,768

(22) Filed: Jan. 29, 2025

(65) Prior Publication Data

US 2025/0171139 A1    May 29, 2025

Related U.S. Application Data

(63) Continuation of application No. 18/337,703, filed on Jun. 20, 2023, now Pat. No. 12,240,600, which is a continuation of application No. 17/324,184, filed on May 19, 2021, now Pat. No. 11,718,397.

(51) Int. Cl.
| | |
|---|---|
| *B64C 29/00* | (2006.01) |
| *B64C 13/24* | (2006.01) |
| *B64D 27/24* | (2006.01) |
| *B64D 27/30* | (2024.01) |
| *B64D 27/31* | (2024.01) |
| *B64D 27/34* | (2024.01) |
| *B64D 35/04* | (2006.01) |
| *B64D 35/08* | (2025.01) |

(52) U.S. Cl.
CPC .......... *B64C 29/0033* (2013.01); *B64C 13/24* (2013.01); *B64D 27/24* (2013.01); *B64D 27/30* (2024.01); *B64D 27/31* (2024.01); *B64D 27/34* (2024.01); *B64D 35/04* (2013.01); *B64D 35/08* (2013.01)

(58) Field of Classification Search
CPC ..... B64C 29/0033; B64C 13/24; B64C 39/04; B64D 27/34; B64D 27/31; B64D 27/30; B64D 27/24; B64D 35/04

See application file for complete search history.

(56) References Cited

U.S. PATENT DOCUMENTS

| | | | | |
|---|---|---|---|---|
| 9,045,226 | B2 * | 6/2015 | Piasecki | B64C 37/00 |
| 2013/0092799 | A1 * | 4/2013 | Tian | B64C 39/10 |
| | | | | 244/7 R |
| 2021/0197965 | A1 * | 7/2021 | Kunz | B64U 30/14 |
| 2021/0253234 | A1 * | 8/2021 | Tao | B64C 27/26 |

(Continued)

*Primary Examiner* — Rodney A Bonnette
(74) *Attorney, Agent, or Firm* — Akona IP PC

(57) ABSTRACT

Embodiments include an aircraft comprising a fuselage; a wing connected to the fuselage; and first and second propulsion systems connected to the wing on opposite sides of the fuselage, wherein at least a portion of each of the first and second propulsion systems and at least a portion of the wing are tiltable between a first position in which the aircraft is in a hover mode and a second position in which the aircraft is in a cruise mode, wherein each of the propulsion systems includes pylon and a rotor assembly comprising a plurality of rotor blades.

20 Claims, 15 Drawing Sheets

(56) References Cited

U.S. PATENT DOCUMENTS

| | | | |
|---|---|---|---|
| 2022/0009625 A1* | 1/2022 | Bower | H02J 1/08 |
| 2022/0009626 A1* | 1/2022 | Baharav | B64C 27/26 |
| 2022/0041277 A1* | 2/2022 | Tian | B64C 35/005 |
| 2022/0306292 A1* | 9/2022 | Ross | B64D 27/31 |

* cited by examiner

ELECTRIC TILTROTOR AIRCRAFT

CROSS REFERENCE TO RELATED APPLICATION

This application is a continuation (and claims benefit of priority under 35 U.S.C. § 120) of U.S. patent application Ser. No. 18/337,703, filed Jun. 20, 2023, and U.S. patent application Ser. No. 17/324,184, filed May 19, 2021, now U.S. Pat. No. 11,728,397, issued Aug. 8, 2023, both disclosures of which are considered part of (and are incorporated by reference in) the disclosure of the present application.

TECHNICAL FIELD

This disclosure relates in general to the field of tiltrotor aircraft and, more particularly, though not exclusively, to various configurations for such aircraft.

BACKGROUND

An electric vertical takeoff and landing (eVTOL) is a type of aircraft that uses electric power to supply rotational energy in an aircraft propulsion system for enabling the aircraft to hover, take off, and land vertically. Because of their versatility and lack of a need for a runway, eVTOLs are particularly useful for providing urban air mobility. As used herein, the term eVTOL also includes VTOLs that use hybrid electric propulsion systems. One particular type of eVTOL is an electric tiltrotor aircraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
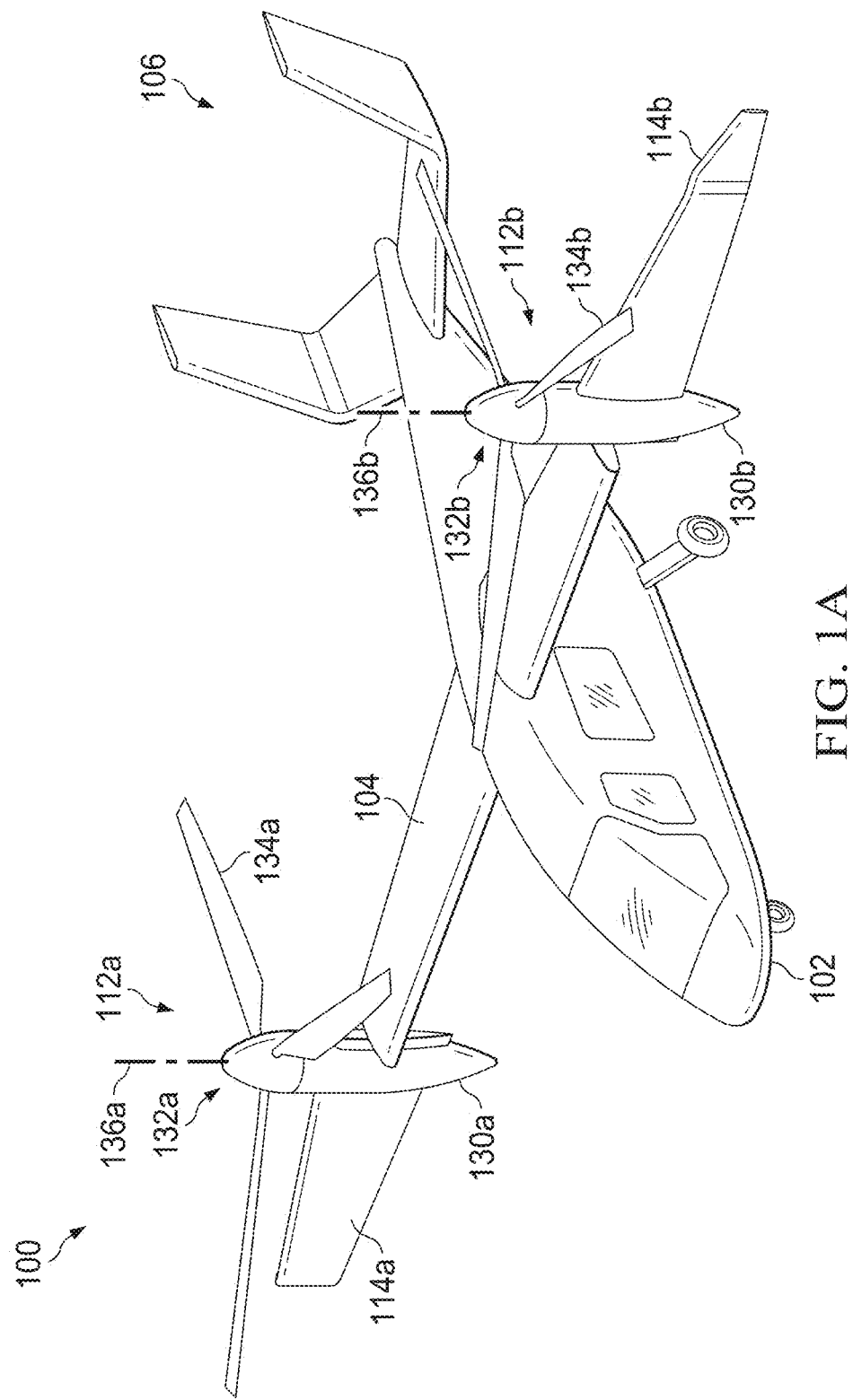
FIGS. 1A and 1B illustrate an electric tiltrotor aircraft configuration in accordance with embodiments described herein.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Electric tiltrotor aircraft configurations described herein are characterized by tilting of the rotors on a wing. In various embodiments, the tiltrotor aircraft configuration rotates the rotor pylon at the side pylon of body, wing station inboard on the wing, or incorporating tiltwing elements with wing rotation as a whole. The degree of wing rotation with the pylon and placement of the axis of rotation relative to the wing are unique elements of embodiments described herein. Rotating a greater portion of the wing with the pylon reduces download of the rotor on the wing but makes transition of the wing from hovering flight to airplane mode flight more difficult, as the rotated portion of the wing will be stalled through a lot of transition increasing rotor power required in transition beyond that required for hover. Variation of wing rotation includes rotating only the pylon and none of the wing which make transition benign but increase power required in a hover to the downwash on the horizontal wing surfaces, rotating an outboard wing extension with the pylon which is a good compromise of download reduction and benign transition, rotating an inboard section of the wing with the pylon which or rotating the whole wing with the pylon both of which increase transition power required from a conventional tiltrotor but reduce download in hover. Pylon rotation actuation is effected through linear or rotary actuators forward, aft, or under the pylon are described herein.

Figure 1B:
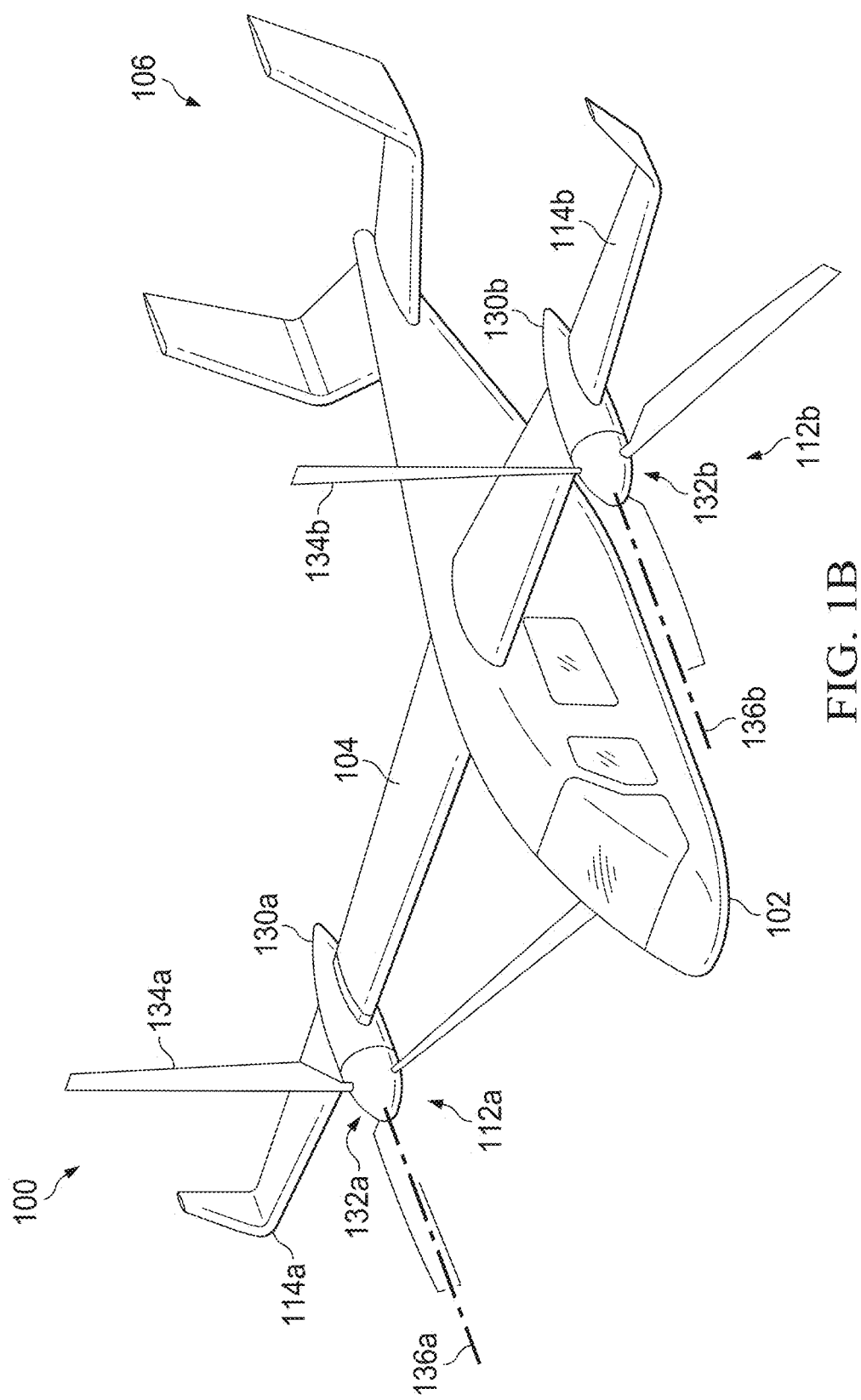

FIGS. 1A and 1B illustrate an example tiltrotor aircraft 100 that is convertible between a VTOL or hover (also commonly referred to as helicopter) mode (shown in FIG. 1A), which allows for vertical takeoff and landing, hovering, and low speed directional movement, and a cruise (also commonly referred to as airplane) mode (shown in FIG. 1B), which allows for forward flight as well as horizontal takeoff and landing. Aircraft 100 includes a fuselage 102, wing 104, and a tail assembly 106. In accordance with features of embodiments described herein, aircraft further includes propulsion systems 112a, 112b, proximate outboard ends of wing 104. Wing tips 114a, 114b, are fixedly connected to outboard sides of propulsion systems 112a, 112b, as will be described below.

In the illustrated embodiment, each propulsion system 112a, 112b, includes a drive system housing comprising a pylon 130a, 130b, and a rotatable open rotor assembly 132a, 132b, comprising a plurality of rotor blades 134a, 134b, connected to a rotor mast and configured to rotate about a rotor axis 136a, 136b. As shown in FIGS. 1A and 1B, each rotor assembly 132a, 132b, includes three (3) rotor blades; however, it should be recognized that more or fewer blades may be implemented without departing from the spirit and the scope of the embodiments described. Rotation of rotor blades 134a, 134b, about rotor axis 136a, 136b, generates lift while operating in helicopter mode and thrust while operating in airplane mode. Each pylon 130a, 130b, may house one or more electric motors therein configured to produce rotational energy that drives the rotation of rotor assembly 132a, 132b. Alternatively, each pylon 130a, 130b, may house a gearbox therein that drives the rotation of rotor assembly 132a, 132b, wherein the gearbox receives rotational energy from a driveshaft.

In accordance with features of embodiments described herein, and as illustrated in FIGS. 1A and 1B, wing tips 114a, 114b, are fixedly attached to outboard sides of pylons 130a, 130b. Inboard sides of pylons 130a, 130b, are tiltably connected to outboard ends of wing 104. In operation, wing tips 114a, 114b, together with propulsion systems 112a, 112b, tilt relative to wing 104 between a first position (FIG. 1A), in which propulsion systems 112a, 112b, and wing tips 114a, 114b, are configured in a hover mode, and a second position (FIG. 1B), in which propulsion systems 112a, 112b, and wing tips 114a, 114b, are configured in a cruise mode.

The position of rotor assemblies 132a, 132b, as well as the pitch of individual rotor blades 134a, 134b, can be selectively controlled in order to selectively control direction, thrust, and lift of aircraft 100. As previously noted, propulsion systems 112a, 112b, are each convertible, relative to fuselage 102, between a vertical position, as shown in FIG. 1A, and a horizontal position, as shown in FIG. 1B. Propulsion systems 112a, 112b, are in the vertical position during vertical takeoff and landing mode. Vertical takeoff and landing mode may be considered to include hover operations of aircraft 100. Propulsion systems 112a, 112b, are in the horizontal position during forward flight mode, in which aircraft 100 is in forward flight. In forward flight mode, propulsion systems 112a, 112b, direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion systems 112a, 112b, including wing tips 114a, 114b, may be tiltable between the vertical and horizontal positions by actuators (not shown) that are tiltable in response to commands originating from a pilot and/or a flight control system. Typically, linear actuators may be used, which attach to the wing tip via a spindle in the outboard tip ribs and attach to a clevis on the pylon support which forms the structure of the pylon. The dual or triply-redundant electric or hydraulic actuator extends pushing the pylon up greater than 90 degrees. A gimbal on the lower wing attach spindle allows the angle of the actuator to rotate as the pylon moves from horizontal to vertical. In a more compact installation, a rotary actuator could be used. The actuator would be installed at a radius about the pylon spindle such that movement of the rotary actuator about the radius would drive the pylon rotation. Each of the propulsion systems 112a, 112b, may utilize a drive system comprising one or more electric motors and gearbox unit disposed within a respective pylon 130a, 130b as a power source to rotate the respective rotor assembly 132a, 132b about rotor axis 136a, 136b via a rotor mast.

Figure 2A:
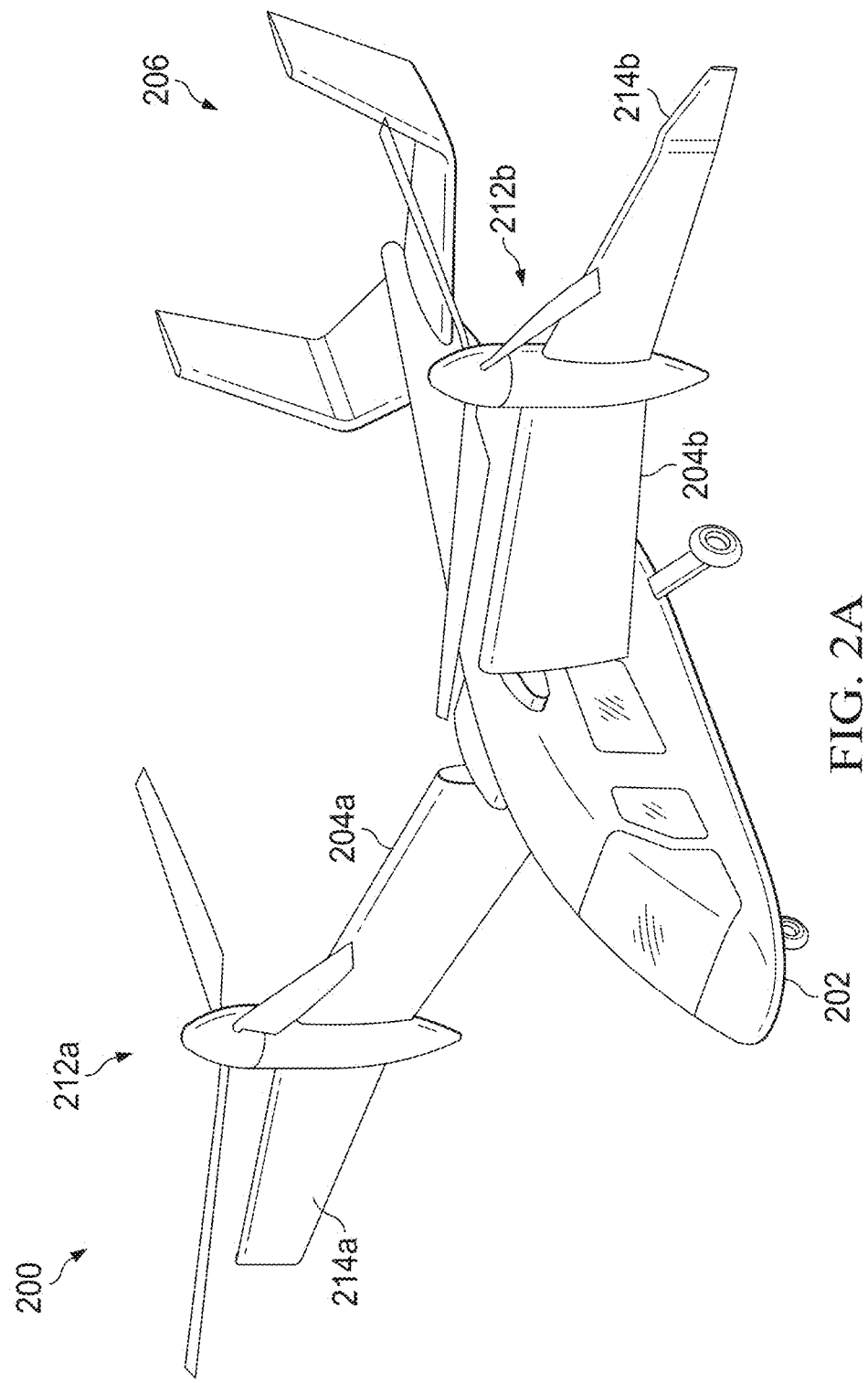
FIGS. 2A and 2B illustrate an electric tiltrotor aircraft configuration in accordance with alternative embodiments described herein.
Figure 2B:
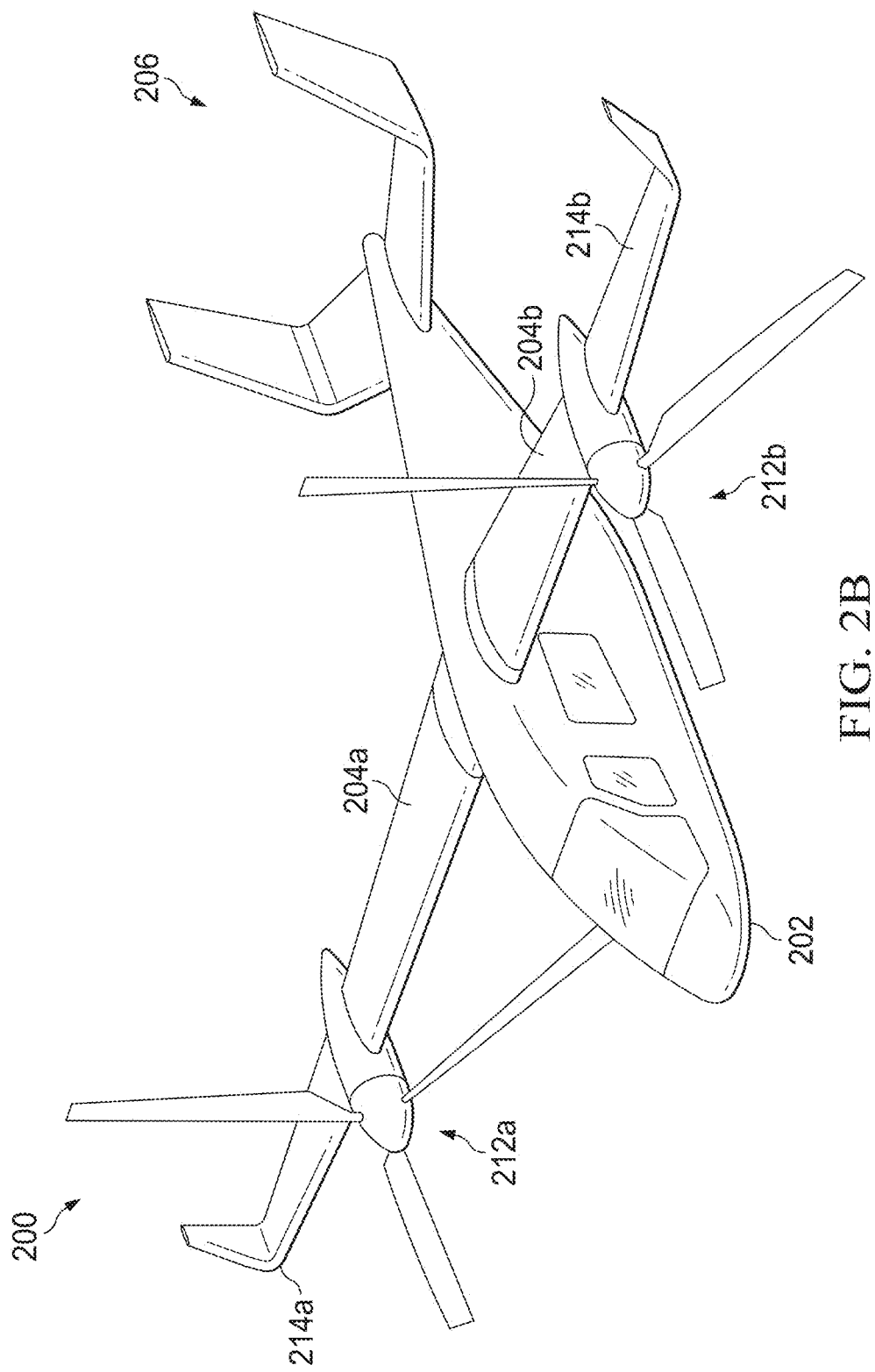

FIGS. 2A and 2B illustrate an example tiltrotor aircraft 200 that is convertible between a VTOL or hover (also commonly referred to as helicopter) mode (shown in FIG. 2A), which allows for vertical takeoff and landing, hovering, and low speed directional movement, and a cruise (also commonly referred to as airplane) mode (shown in FIG. 2B), which allows for forward flight as well as horizontal takeoff and landing. Aircraft 200 includes a fuselage 202, wing 204 comprising wing segments 202a, 202b, tiltably connected to fuselage 202, and a tail assembly 206. In accordance with features of embodiments described herein, aircraft further includes propulsion systems 212a, 212b, integrated into respective wing segments 204a, 204b. Wing tips 214a, 214b, are fixedly connected to outboard sides of propulsion systems 212a, 212b.

Similar to the propulsion systems of aircraft 100, each of propulsion systems 212a, 212b, may include a drive system housing comprising a pylon, and a rotatable open rotor assembly comprising a plurality of rotor blades connected to a rotor mast and configured to rotate about a rotor axis. As shown in FIGS. 2A and 2B, the rotor assembly of each of propulsion systems 212a, 212b, includes three (3) rotor blades; however, it should be recognized that more or fewer blades may be implemented without departing from the spirit and the scope of the embodiments described. Rotation of rotor assemblies of propulsion systems 212a, 212b, generates lift while the aircraft 200 is operating in helicopter mode and thrust while the aircraft 200 is operating in airplane mode.

In accordance with features of embodiments described herein, and as illustrated in FIGS. 2A and 2B, propulsion systems 212a, 212b (including wing tips 214a, 214b), and wing segments 204a, 204b, which tilt relative to fuselage 202 between a first position (FIG. 2A), in which wing segments 204a, 204b, and propulsion systems 212a, 212b, are configured in a hover mode, and a second position (FIG. 2B), in which wing segments 204a, 204b, and propulsion systems 212a, 212b, are configured in a cruise mode.

Figure 6A:
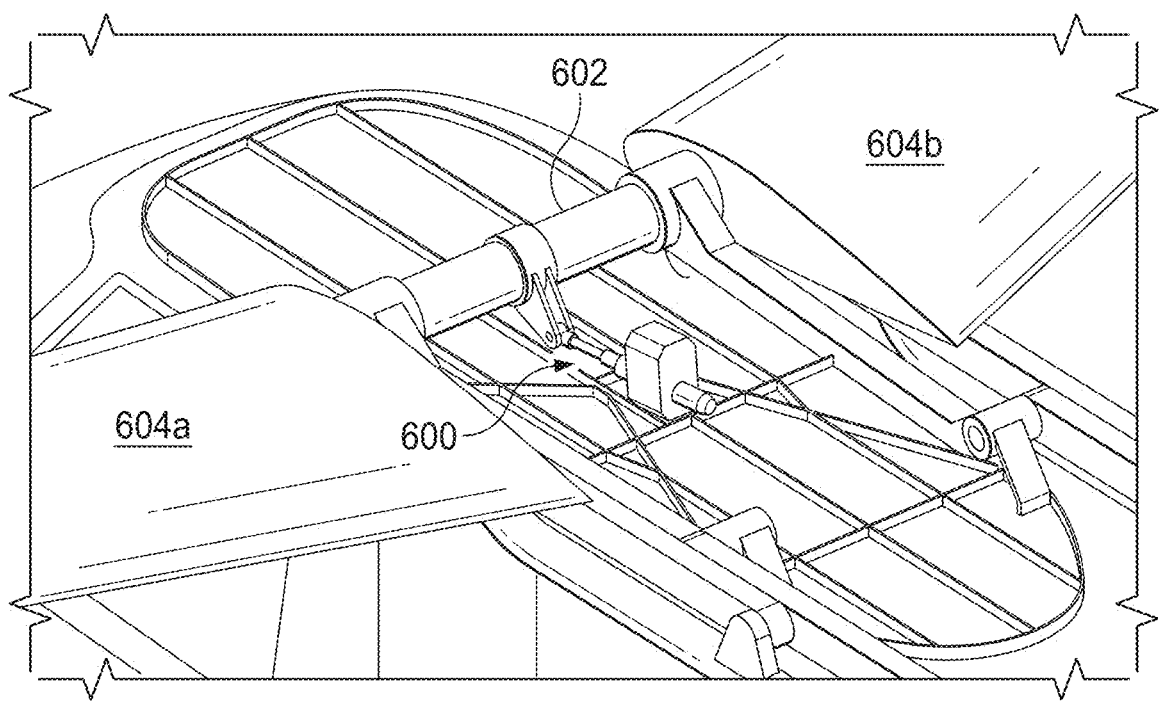
FIGS. 6A and 6B illustrate additional details of a spindle type of tiltrotor wing connection mechanism that may be deployed in alternative embodiments described herein such as illustrated in FIGS. 2A, 2B, 5A, and 5B.
Figure 6B:
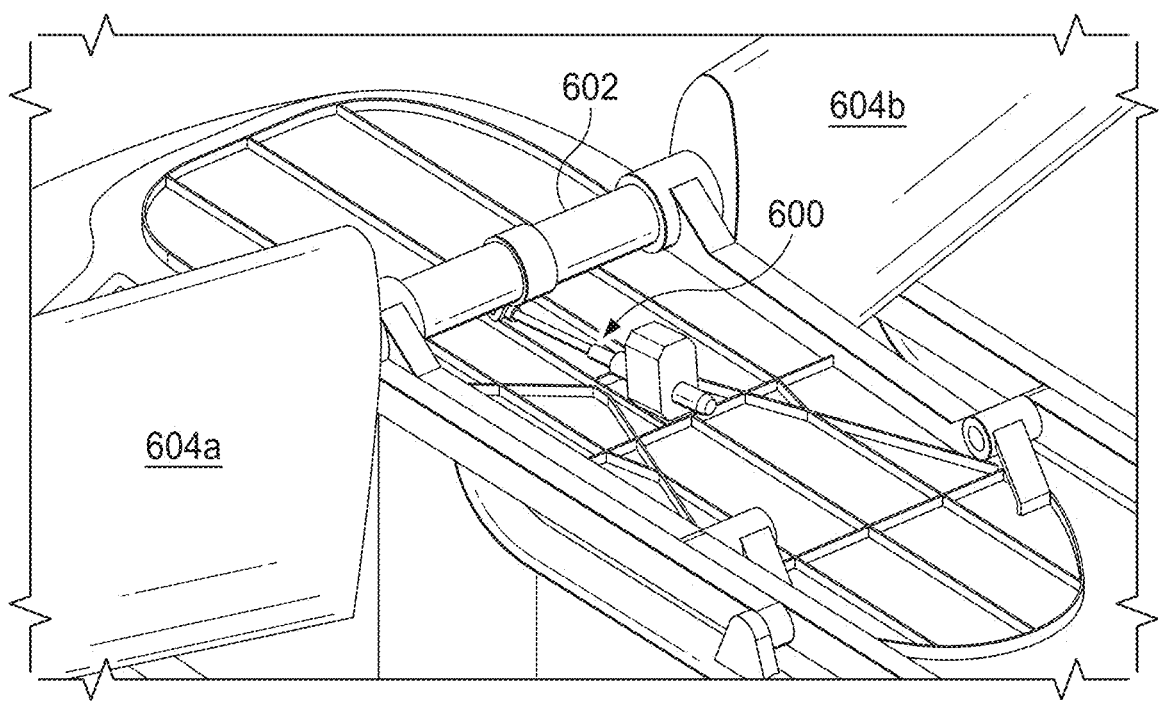
Figure 7A:
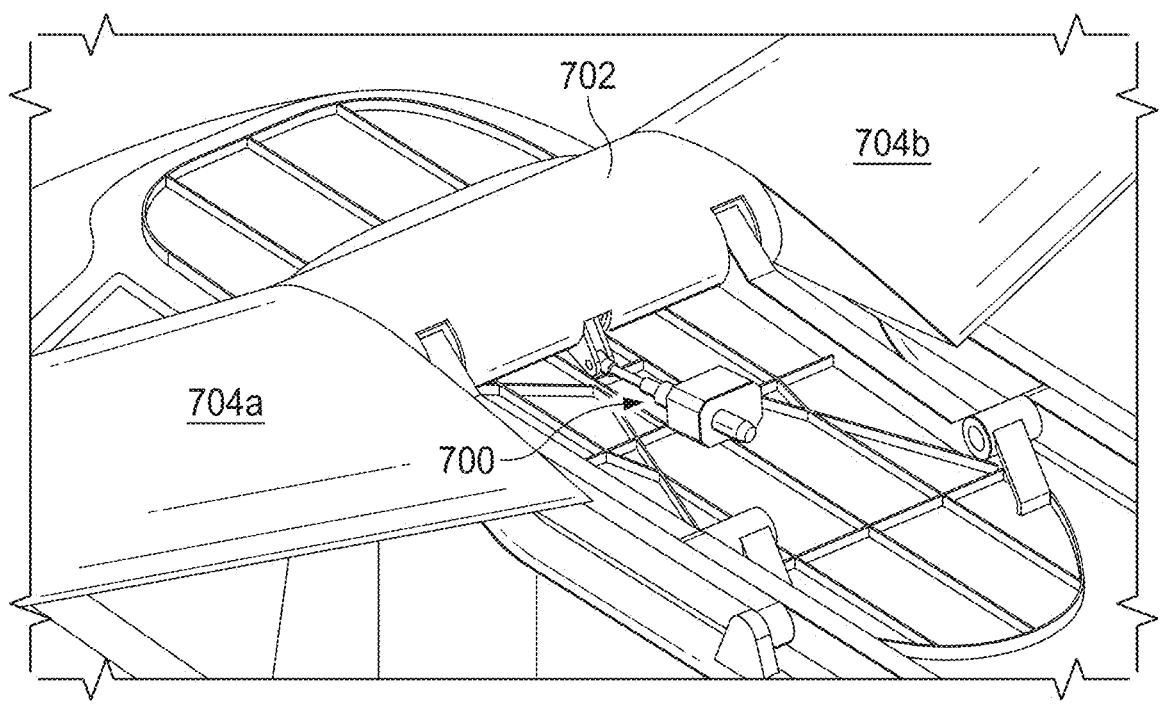
FIGS. 7A and 7B illustrate additional details of a carry-through type of tiltrotor wing connection mechanism that may be deployed in alternative embodiments described herein such as illustrated in FIGS. 3A and 3B.
Figure 7B:
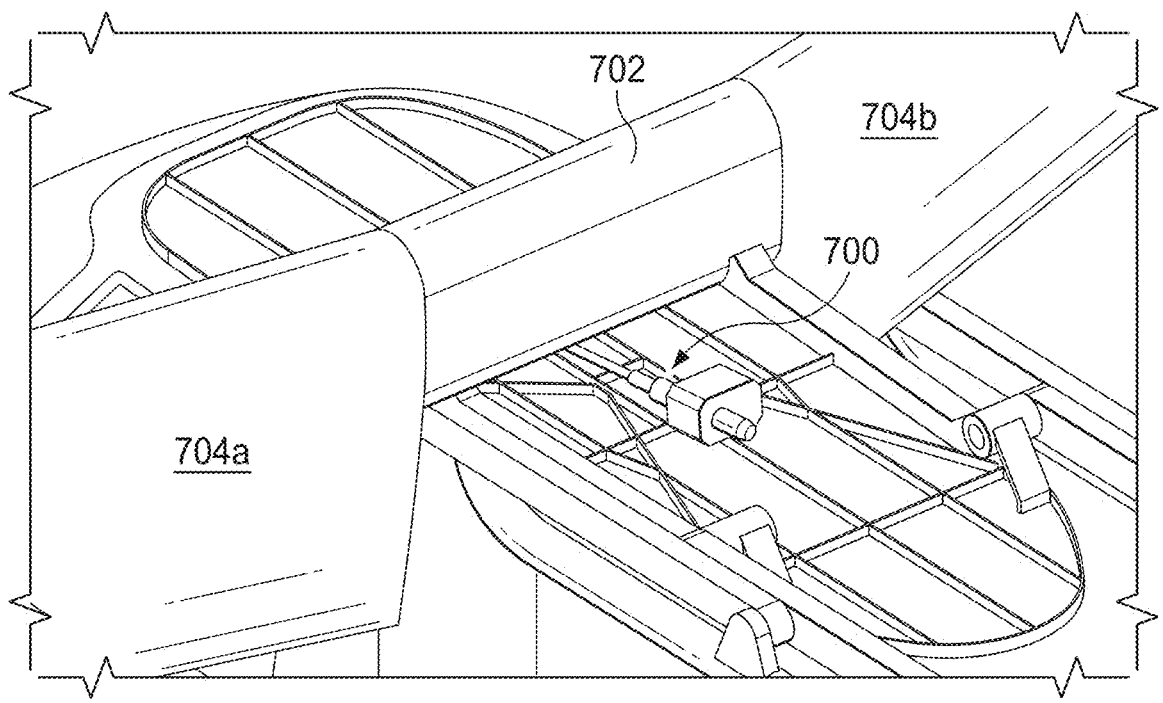

The position of wing segments 204a, 204b, rotor assemblies of propulsion systems 212a, 212b, as well as the pitch of individual rotor blades of all of the propulsion systems 212a, 212b, can be selectively controlled in order to selectively control direction, thrust, and lift of aircraft 200. As previously noted, propulsion systems 212a, 212b, are each convertible, relative to fuselage 202, between a vertical position, as shown in FIG. 2A, and a horizontal position, as shown in FIG. 2B. Propulsion systems 212a, 212b, are in the vertical position during vertical takeoff and landing mode. Vertical takeoff and landing mode may be considered to include hover operations of aircraft 200. Propulsion systems 212a, 212b, are in the horizontal position during forward flight mode, in which aircraft 200 is in forward flight. In forward flight mode, propulsion systems 212a, 212b, direct their respective thrusts in the aft direction to propel aircraft 200 forward. Aircraft 200 is operable to fly in all directions during the vertical takeoff and landing mode configuration of FIG. 2A, although faster forward flight is achievable while in the forward flight mode configuration of FIG. 2B. Propulsion systems 212a, 212b, may be tiltable between the vertical and horizontal positions by actuators that are tiltable in response to commands originating from a pilot and/or a flight control system. A linear actuator (or a group of two or more linear actuators for redundancy) attached to the aft spar as shown in FIGS. 7A and 7B or a spindle connecting the two wing boxes as shown in FIGS. 6A and 6B and pushing the trailing edge of the wing down are possible implementations.

Figure 3A:
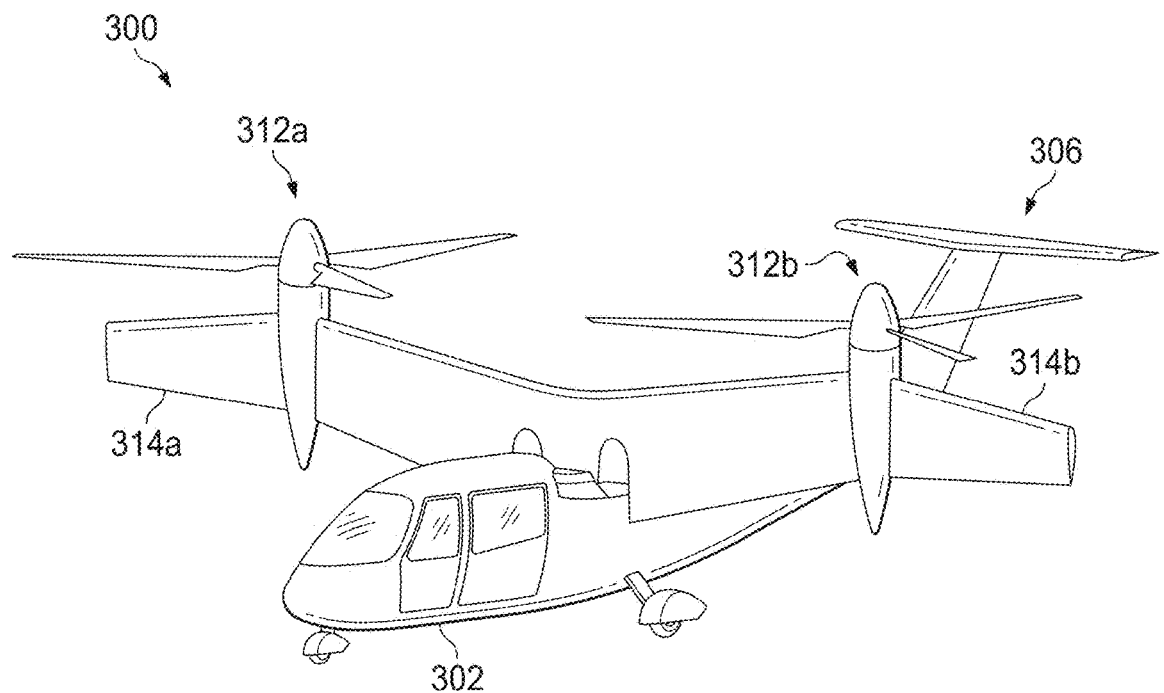
FIGS. 3A and 3B illustrate an electric tiltrotor aircraft configuration in accordance with alternative embodiments described herein.
Figure 3B:
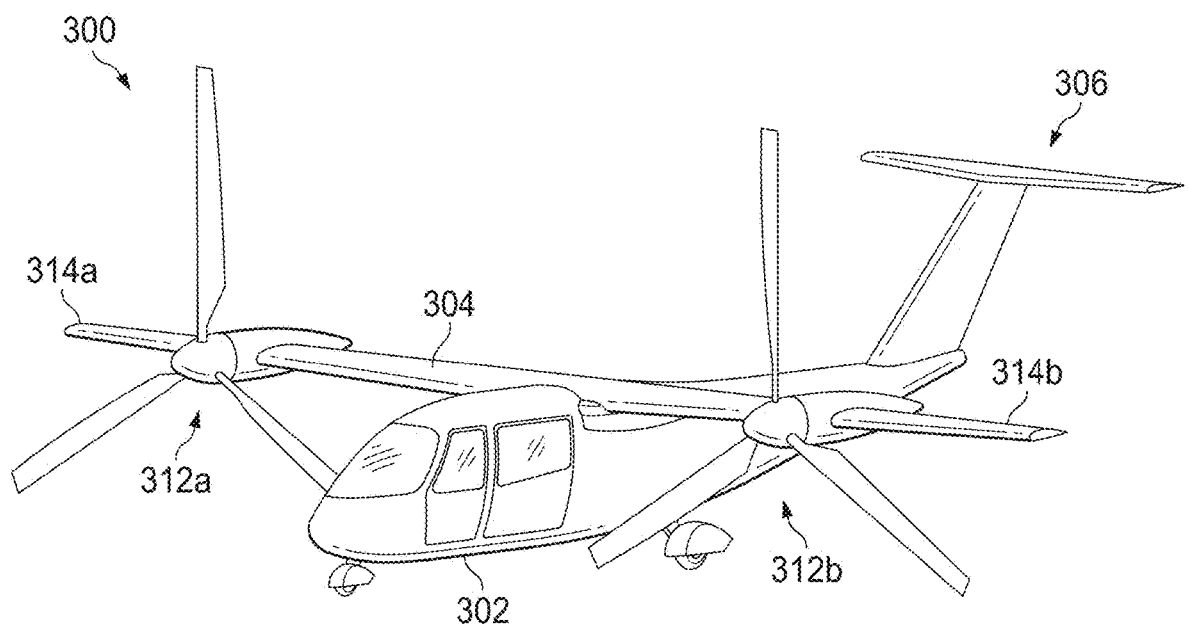

FIGS. 3A and 3B illustrate an example tiltrotor aircraft 300 that is convertible between a VTOL or hover (also commonly referred to as helicopter) mode (shown in FIG. 3A), which allows for vertical takeoff and landing, hovering, and low speed directional movement, and a cruise (also commonly referred to as airplane) mode (shown in FIG. 3B), which allows for forward flight as well as horizontal takeoff and landing. Aircraft 300 includes a fuselage 302, wing 304, and tail assembly 306. In accordance with features of embodiments described herein, aircraft further includes propulsion systems 312a, 312b. In the illustrated embodiment, propulsion systems 312a, 312b, are integrated into wing 304 proximate outboard ends thereof. Wing tips 314a, 314b, are fixedly connected to outboard sides of propulsion systems 312a, 312b.

Similar to the propulsion systems of aircraft 100, each of propulsion systems 312a, 312b may include a drive system housing comprising a pylon, and a rotatable open rotor assembly comprising a plurality of rotor blades connected to a rotor mast and configured to rotate about a rotor axis. As shown in FIGS. 3A and 3B, the rotor assembly of each of propulsion systems 312a, 312b, includes three (3) rotor blades; however, it should be recognized that more or fewer blades may be implemented without departing from the spirit and the scope of the embodiments described. Rotation of rotor assemblies of propulsion systems 312a, 312b, generates lift while the aircraft 300 is operating in helicopter mode and thrust while the aircraft 300 is operating in airplane mode.

In accordance with features of embodiments described herein, and as illustrated in FIGS. 3A and 3B, wing 304, including propulsion systems 312a, 312b, and wing tips 314a, 314b, is tiltably connected to the fuselage 302, and tilts relative to the fuselage between a first position (FIG. 3A), in which wing 304 and propulsion systems 312a, 312b, are configured in a hover mode, and a second position (FIG. 3B), in which wing 304 and propulsion systems 312a, 312b, are configured in a cruise mode.

The position of wing 304 and propulsion systems 312a, 312b, (including wing tips 314a, 314b) as well as the pitch of individual rotor blades of the propulsion systems 312a, 312b, can be selectively controlled in order to selectively control direction, thrust, and lift of aircraft 300. As previously noted, wing 304, including propulsion assemblies 312a, 312b, is convertible, relative to fuselage 302, between a vertical position, as shown in FIG. 3A, and a horizontal position, as shown in FIG. 3B. Wing 304 and propulsion systems 312a, 312b, are in the vertical position during vertical takeoff and landing mode. Vertical takeoff and landing mode may be considered to include hover operations of aircraft 300. Wing 304 and propulsion systems 312a, 312b, are in the horizontal position during forward flight mode, in which aircraft 300 is in forward flight. In forward flight mode, propulsion systems 312a, 312b, direct their respective thrusts in the aft direction to propel aircraft 300 forward. Aircraft 300 is operable to fly in all directions during the vertical takeoff and landing mode configuration of FIG. 3A, although faster forward flight is achievable while in the forward flight mode configuration of FIG. 3B. Wing 304 and propulsion systems 312a, 312b, may be tiltable between the vertical and horizontal positions by actuators (not shown) that are tiltable in response to commands originating from a pilot and/or a flight control system. FIGS. 7A and 7B illustrate a possible actuator arrangement in which a linear actuator tilts the aft spar of the wing box down and forward up in a streamlined arrangement. Actuator attach points can be varied to tailor mechanical advantage.

Figure 4A:
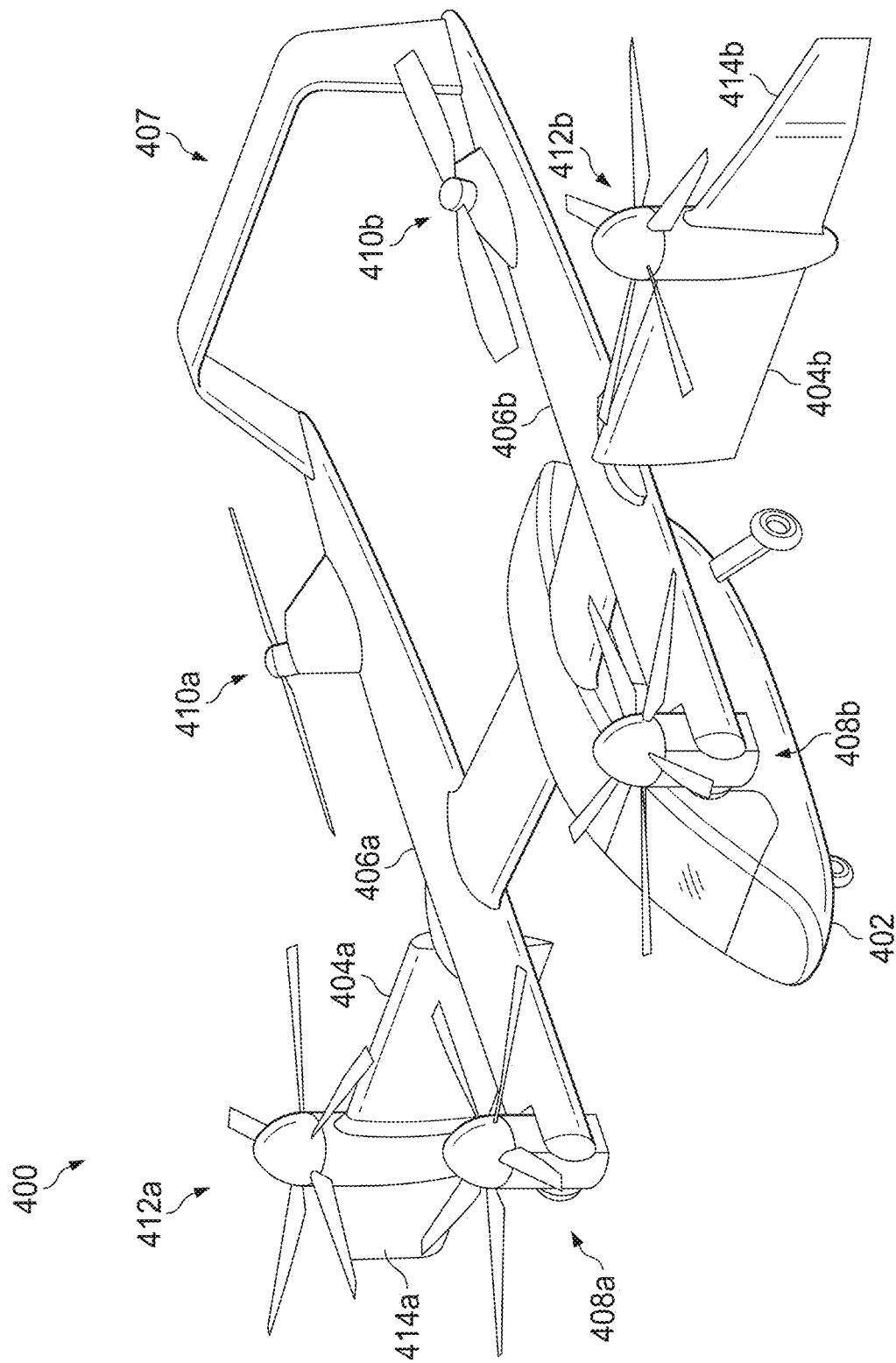
FIGS. 4A and 4B illustrate an electric tiltrotor aircraft configuration in accordance with alternative embodiments described herein.
Figure 4B:
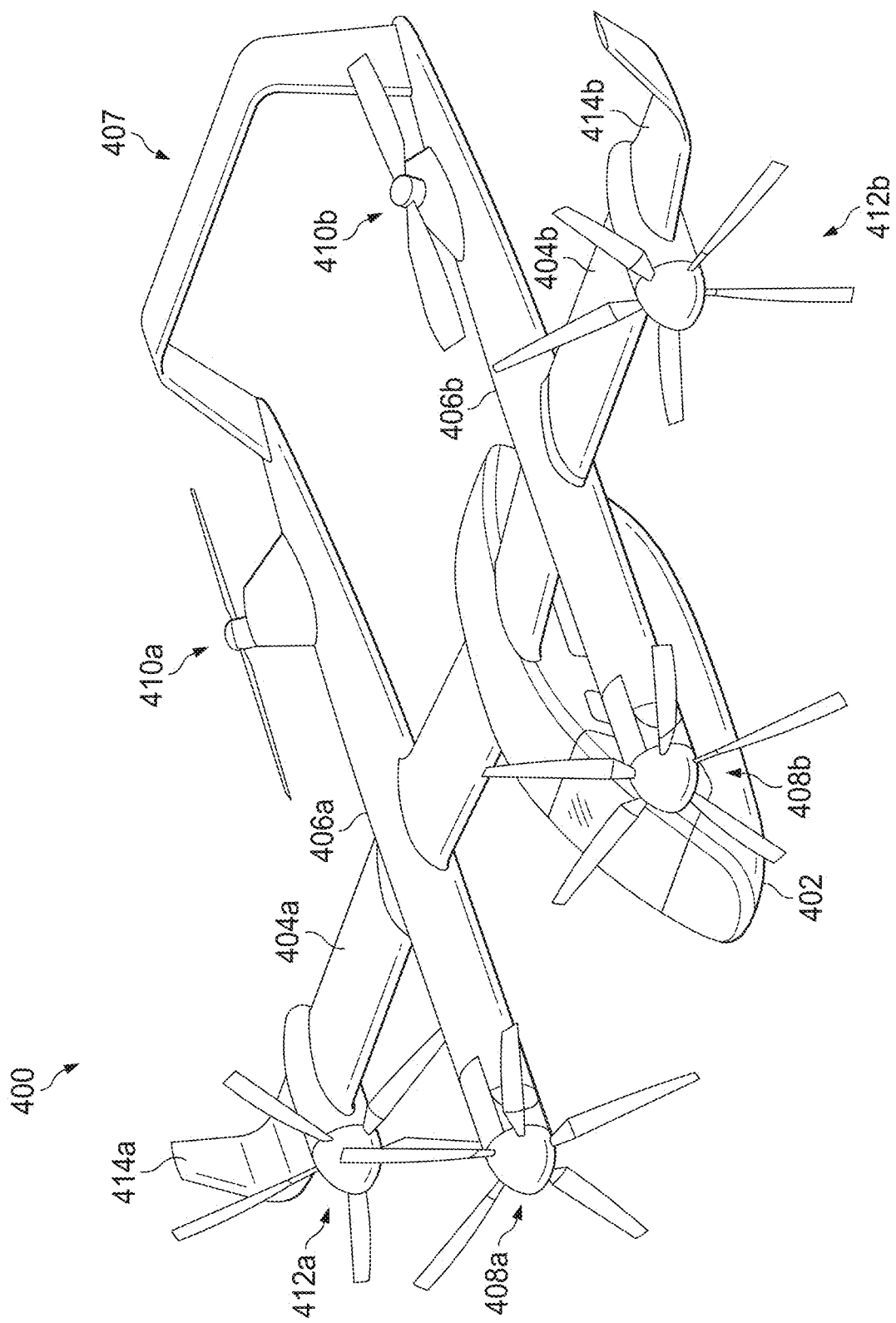

FIGS. 4A and 4B illustrate an example tiltrotor aircraft 400 that is convertible between a VTOL or hover (also commonly referred to as helicopter) mode (shown in FIG. 4A), which allows for vertical takeoff and landing, hovering, and low speed directional movement, and a cruise (also commonly referred to as airplane) mode (shown in FIG. 4B), which allows for forward flight as well as horizontal takeoff and landing. Aircraft 400 includes a fuselage 402, wings 404a, 404b, booms 406a, 406b, connected to opposite sides of the fuselage 402, and a tail assembly 407. In accordance with features of embodiments described herein, aircraft further includes three pairs of propulsion systems, including a forward pair of boom-mounted propulsion systems 408a, 408b, an aft pair of boom-mounted propulsion systems 410a, 410b, and a pair of propulsion systems 412a, 412b. In the illustrated embodiment, propulsion systems 412a, 412b, are integrated into wings 404a, 404b, which are tiltably connected to outboard sides of booms 406a, 406b. Wing tips 414a, 414b, are fixedly connected to outboard sides of propulsion systems 412a, 412b. Propulsion systems 408a, 408b, are tiltably connected to the forward ends of wing booms 404a, 404b. Propulsion systems 410a, 410b, are mounted to top surfaces of booms 406a, 406b, proximate the aft end of the fuselage 402.

Similar to the propulsion systems of aircraft 100, each of propulsion systems 408a, 408b, 410a, 410b, 412a, and 412b may include a drive system housing comprising a pylon, and a rotatable open rotor assembly comprising a plurality of rotor blades connected to a rotor mast and configured to rotate about a rotor axis. As shown in FIGS. 4A and 4B, the rotor assembly of each of propulsion systems 408a, 408b, 412a, 412b, includes five (5) rotor blades; however, it should be recognized that more or fewer blades may be implemented without departing from the spirit and the scope of the embodiments described. It should also be recognized that rotor assemblies of propulsion systems 408a, 408b, may include a different number of rotor blades than rotor assemblies of propulsion systems 412a, 412b. Rotation of rotor assemblies of propulsion systems 408a, 408b, 412a, and 412b generates lift while the aircraft 400 is operating in helicopter mode and thrust while the aircraft 400 is operating in airplane mode.

In the illustrated embodiment, each boom-mounted propulsion system 410a, 410b, includes a drive system housing comprising a pylon and a rotatable open rotor assembly comprising a plurality of rotor blades connected to a rotor mast and configured to rotate about a rotor axis. As shown in FIGS. 4A and 4B, each rotor assembly of propulsion systems 410a, 410b, includes two (2) rotor blades; however, it should be recognized that more or fewer blades may be implemented without departing from the spirit and the scope of the embodiments described. Rotation of rotor assemblies of propulsion systems 410a, 410b, generates lift while the aircraft 400 is operating in helicopter mode. It will be recognized that while rotor assemblies of propulsion systems 410a, 410b, are illustrated as being disposed above (i.e., on top of) booms 406a, 406b, they may alternatively be disposed below (i.e., on the underside of) booms.

In accordance with features of embodiments described herein, and as illustrated in FIGS. 4A and 4B, propulsion systems 412a, 412b, are integrated into wings 404a, 404b. Wings 404a, 404b, together with wing-mounted propulsion systems 412a, 412b (including wing extensions 414a, 414b), tilt relative to booms 406a, 406b, and fuselage 402 between a first position (FIG. 4A), in which wings 404a, 404b, and propulsion systems 412a, 412b, are configured in a hover mode, and a second position (FIG. 4B), in which wings 404a, 404b, and propulsion systems 412a, 412b, are configured in a cruise mode.

Forward propulsion systems 408a, 408b, are tiltably connected to forward ends of booms and tiltable between a first position (FIG. 4A), in which propulsion systems 408a, 408b, are configured in a hover mode, and a second position (FIG. 4B), in which propulsion systems 408a, 408b, are configured in a cruise mode. In accordance with features of embodiments described herein, aft propulsion systems 410a, 410b, are fixedly attached to booms 406a, 406b, aft of the wing 404 in hover mode and do not convert between hover mode (FIG. 4A) and cruise mode (FIG. 4B).

The position of wings 404a, 404b, including propulsion systems 412a, 412b, and propulsion systems 408a, 408b, as well as the pitch of individual rotor blades of all of the propulsion systems 408a, 408b, 410a, 410b, 412a, 412b, can be selectively controlled in order to selectively control direction, thrust, and lift of aircraft 400. As previously noted, propulsion systems 408a, 408b, 412a, 412b, are each convertible, relative to fuselage 402, between a vertical position, as shown in FIG. 4A, and a horizontal position, as shown in FIG. 4B. Propulsion systems 408a, 408b, 412a, 412b, are in the vertical position during vertical takeoff and landing mode. Vertical takeoff and landing mode may be considered to include hover operations of aircraft 400. Propulsion systems 408a, 408b, 412a, 412b, are in the horizontal position during forward flight mode, in which aircraft 400 is in forward flight. In forward flight mode, propulsion systems 408a, 408b, 412a, 412b, direct their respective thrusts in the aft direction to propel aircraft 400 forward. Aircraft 400 is operable to fly in all directions during the vertical takeoff and landing mode configuration of FIG. 4A, although faster forward flight is achievable while in the forward flight mode configuration of FIG. 4B. Wings 404a, 404b, including propulsion systems 412a, 412b, and propulsion systems 408a, 408b, may be tiltable between the vertical and horizontal positions by actuators (not shown) that are tiltable in response to commands originating from a pilot and/or a flight control system. Linear actuators which attach to the wing via a spindle in the wing common to the wing ribs attach to a clevis on the side of the boom. The dual or triply-redundant electric or hydraulic actuator extends rotating the wing.

It should be noted that, although propulsion systems 408a, 408b, are shown and described as being tiltable between cruise and hover positions, those propulsion systems may be fixed in the hover positions, similarly to propulsion systems 410a, 410b.

Figure 5A:
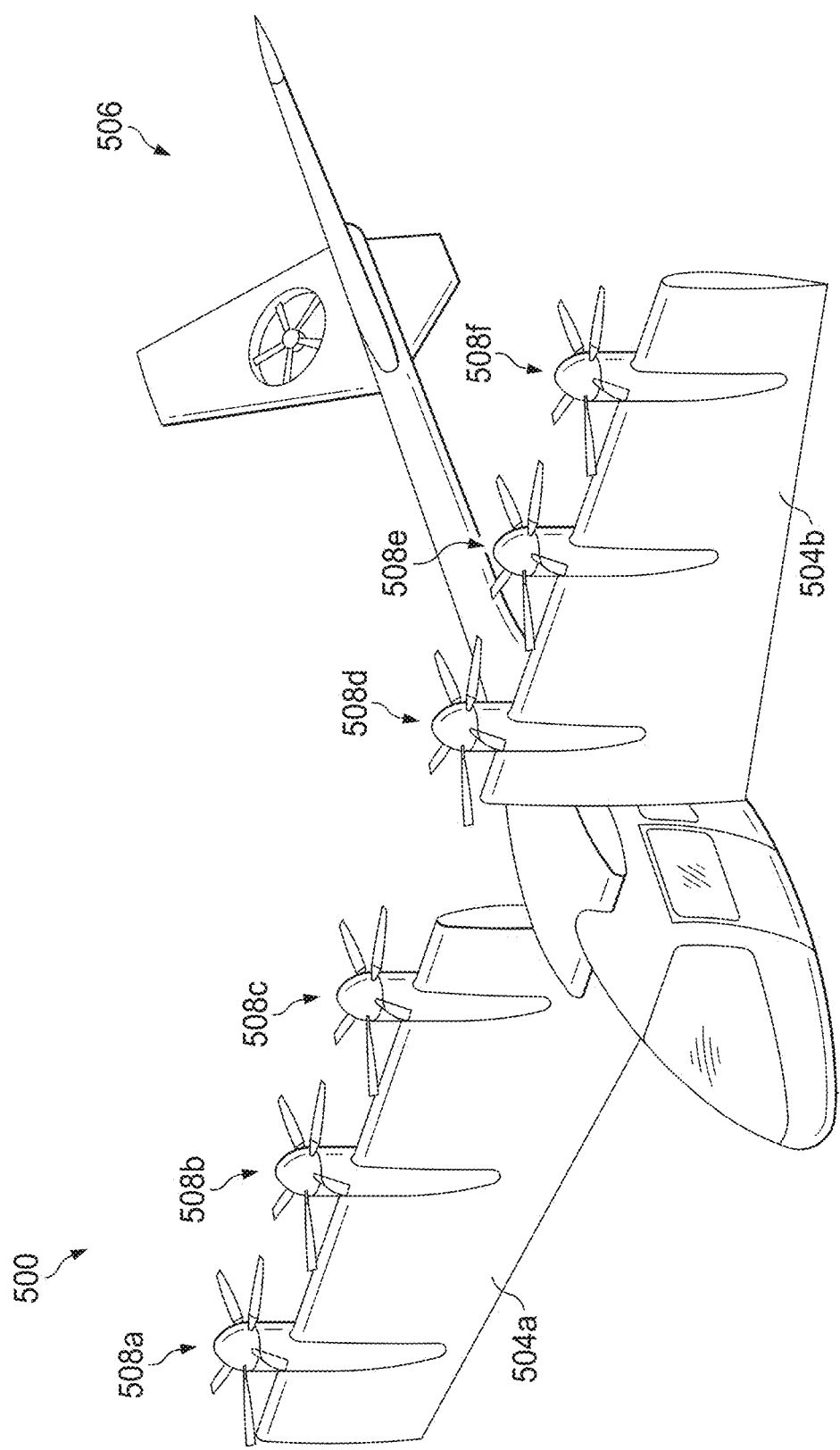
FIGS. 5A and 5B illustrate an electric tiltrotor aircraft configuration in accordance with alternative embodiments described herein.
Figure 5B:
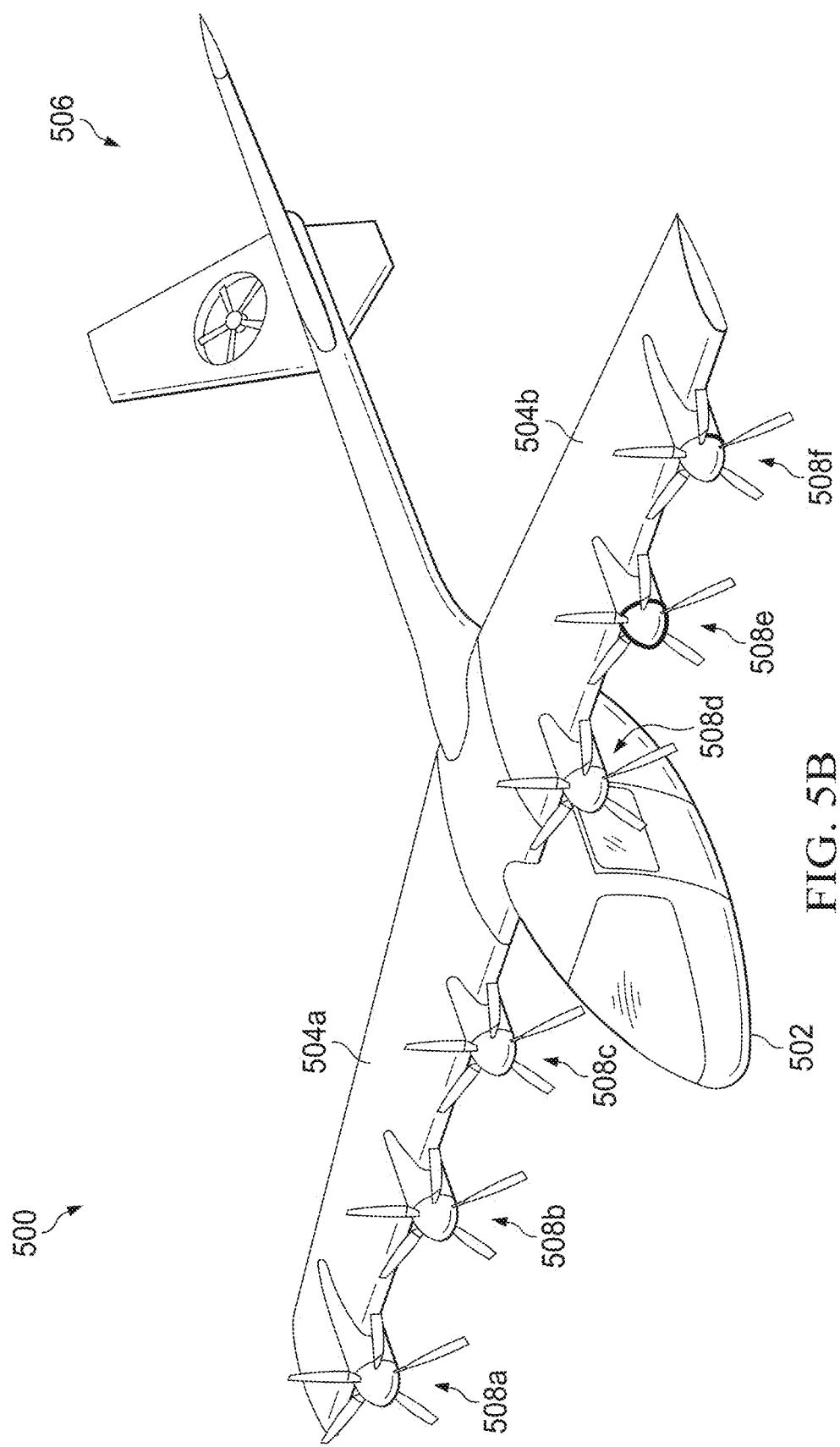

FIGS. 5A and 5B illustrate an example tiltrotor aircraft 500 that is convertible between a VTOL or hover (also commonly referred to as helicopter) mode (shown in FIG. 5A), which allows for vertical takeoff and landing, hovering, and low speed directional movement, and a cruise (also commonly referred to as airplane) mode (shown in FIG. 5B), which allows for forward flight as well as horizontal takeoff and landing. Aircraft 500 includes a fuselage 502, wings 504a, 504b, and a tail assembly 506. In accordance with features of embodiments described herein, aircraft further includes a plurality of propulsion systems 508a-508f integrated into wings 504a, 504b.

Similar to the propulsion systems of aircraft 100, each of propulsion systems 508a-508f may include a drive system housing comprising a pylon, and a rotatable open rotor assembly comprising a plurality of rotor blades connected to a rotor mast and configured to rotate about a rotor axis. As shown in FIGS. 5A and 5B, the rotor assembly of each of propulsion systems 508a-508f includes five (5) rotor blades; however, it should be recognized that more or fewer blades may be implemented without departing from the spirit and the scope of the embodiments described. It should also be recognized that rotor assemblies of propulsion systems 508a-508f may include different numbers of rotor blades. Still further, although six propulsion systems are illustrated, it will be recognized that more or fewer propulsion assemblies may be integrated into wings 504a, 504b. Rotation of one or more rotor assemblies of propulsion systems 508a-508f lift while the aircraft 500 is operating in helicopter mode and thrust while the aircraft 500 is operating in airplane mode.

In accordance with features of embodiments described herein, and as illustrated in FIGS. 5A and 5B, wings 504a, 504b, including propulsion systems 508a-508f, are tiltably connected to the fuselage 502, and tilt relative to the fuselage between a first position (FIG. 53A), in which wings 504a, 504b, and propulsion systems 508a-508f, are configured in a hover mode, and a second position (FIG. 5B), in which wings 504a, 504b, and propulsion systems 508a-508f are configured in a cruise mode.

The position of wings 504a, 504b, and rotor assemblies of propulsion systems 508a-508f, as the pitch of individual rotor blades of all of the propulsion systems, can be selectively controlled in order to selectively control direction, thrust, and lift of aircraft 500. As previously noted, wings 504a, 504b, including propulsion systems 508a-508f, are convertible, relative to fuselage 502, between a vertical position, as shown in FIG. 5A, and a horizontal position, as shown in FIG. 5B. Wings 504a, 504b, including propulsion systems 508a-508f, are in the vertical position during vertical takeoff and landing mode. Vertical takeoff and landing mode may be considered to include hover operations of aircraft 500. Wings 504a, 504b, including propulsion systems 508a-508f, are in the horizontal position during forward flight mode, in which aircraft 500 is in forward flight. In forward flight mode, propulsion systems 508a-508f, direct their respective thrusts in the aft direction to propel aircraft 500 forward. Aircraft 500 is operable to fly in all directions during the vertical takeoff and landing mode configuration of FIG. 5A, although faster forward flight is achievable while in the forward flight mode configuration of FIG. 5B. Wings 504a, 504b, and propulsion systems 508a-508f, may be tiltable between the vertical and horizontal positions by actuators (not shown) in response to commands originating from a pilot and/or a flight control system. Each wing or the complete wing may be actuated with a linear or rotary actuary. Examples of a possible mechanism are shown in FIGS. 6 and 7. In this case several motor driving several rotors/props are arranged along the rotating wing.

FIGS. 6A and 6B illustrate in greater detail a mechanism for actuating a wing of a spindle wing configuration, such as illustrated in FIGS. 2A and 2B, in accordance with details of embodiments described herein. In particular, FIGS. 6A and 6B show a linear actuator 600 actuating a spindle 602 connecting the left and right wing boxes 604a, 604b. Two or more linear actuators could also be used for redundancy. FIG. 6A shows the wings/wing boxes 604a, 604b, in horizontal mode. FIG. 6B shows the wings/wing boxes 604a, 604b in vertical mode. It will be noted that, although as shown in FIGS. 6A and 6B, actuator 600 is a linear actuator, in various implementations, one or more rotary or other type of actuator may advantageously be employed.

FIGS. 7A and 7B illustrate in greater detail a mechanism for actuating a wing of a carry-through wing configuration, such as illustrated in FIGS. 3A and 3B, in accordance with details of embodiments described herein. In FIGS. 7A and 7B, a linear actuator 700 actuates a carry through torque box 702 of a continuous wing including left and right wing boxes 704a, 704b. Two or more linear actuators could also be used for redundancy. FIG. 7A shows the wings/wing boxes 704a, 704b, in horizontal mode. FIG. 7B shows the wings/wing boxes 704a, 704b in vertical mode. It will be noted that, although as shown in FIGS. 7A and 7B, actuator 700 is a linear actuator, in various implementations, one or more rotary or other type of actuator may advantageously be employed.

Figure 8A:
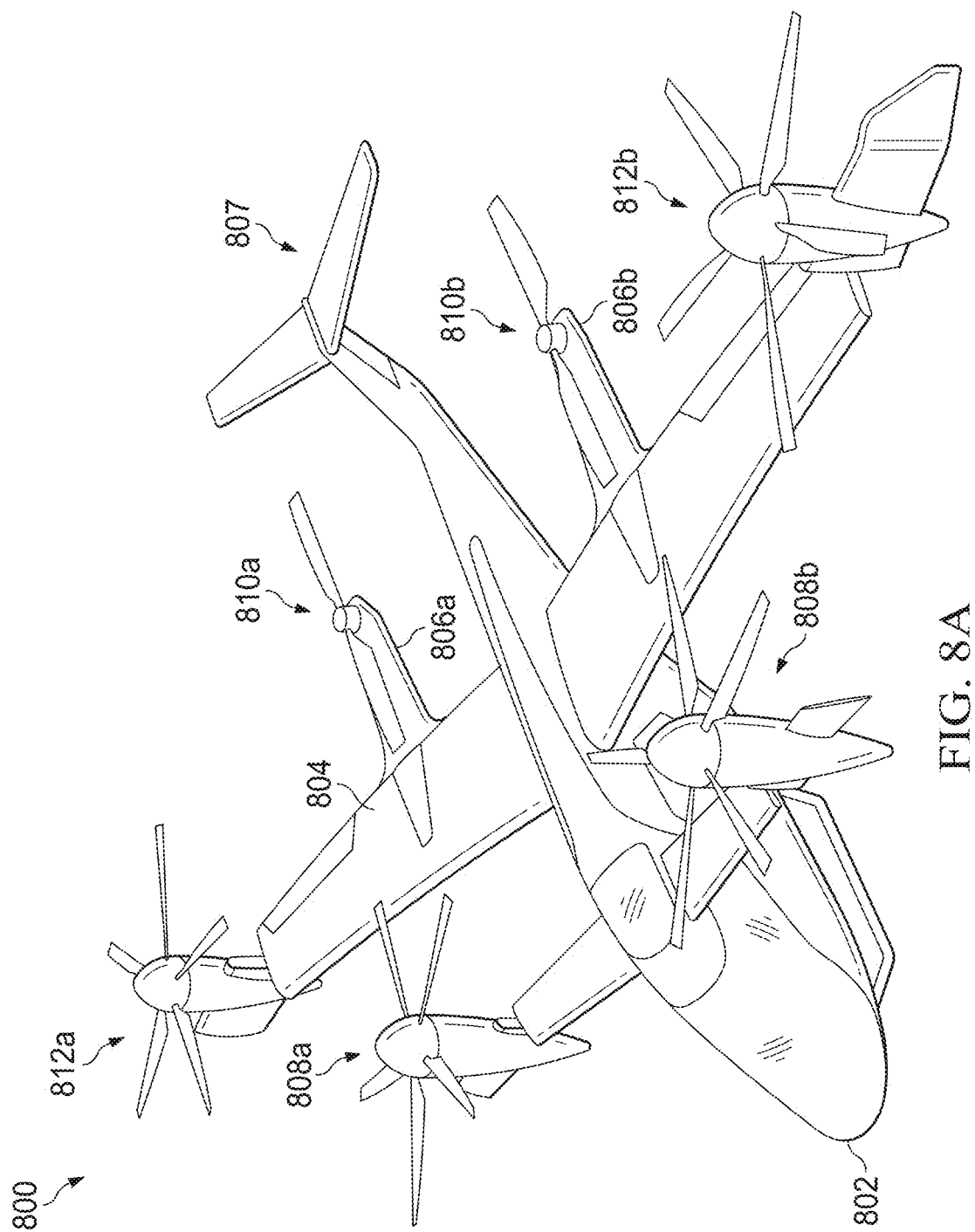
FIGS. 8A and 8B illustrate an electric tiltrotor aircraft configuration in accordance with alternative embodiments described herein.
Figure 8B:
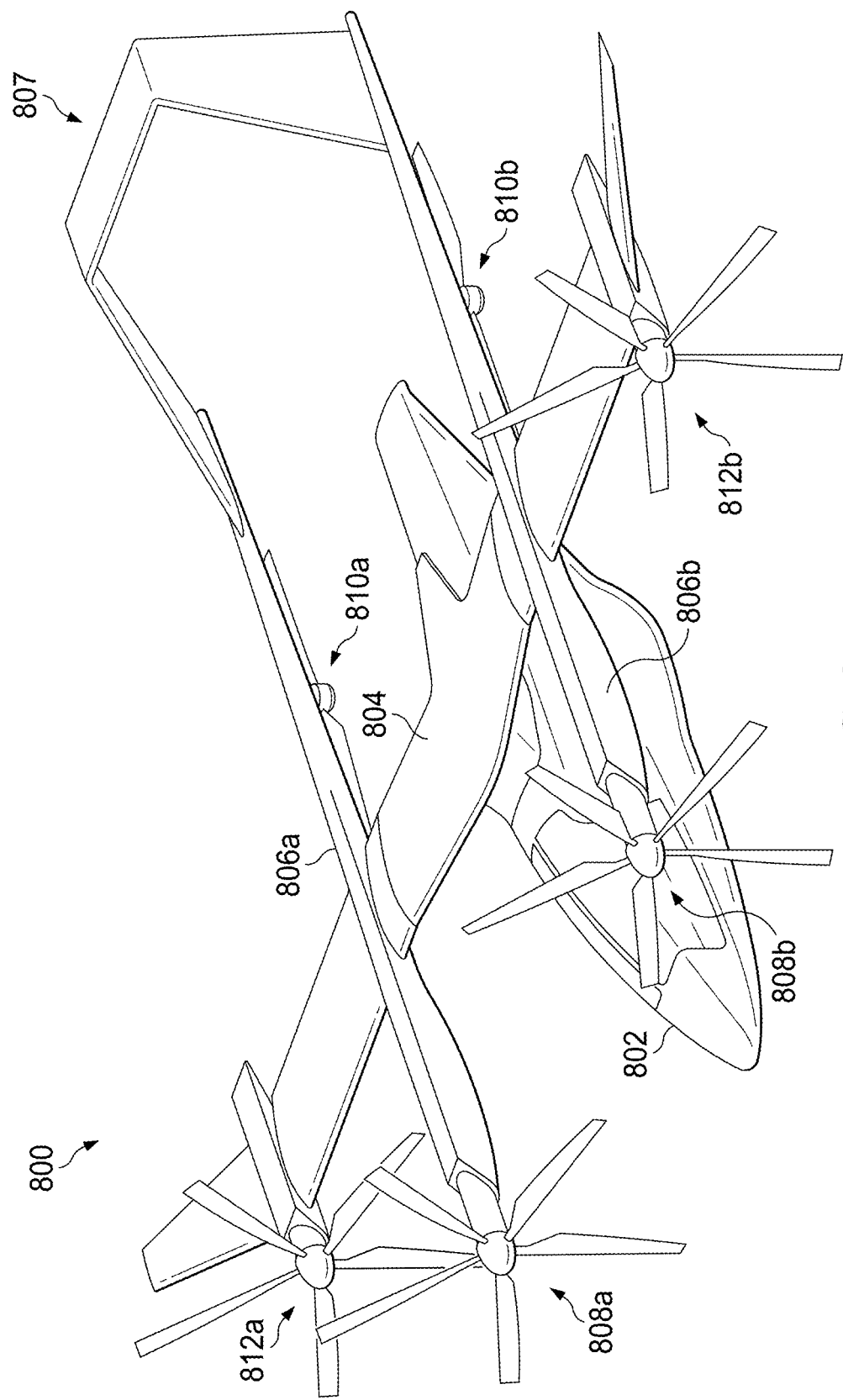

FIGS. 8A and 8B illustrate an example tiltrotor aircraft 800 that is convertible between a VTOL or hover (also commonly referred to as helicopter) mode (shown in FIG. 8A), which allows for vertical takeoff and landing, hovering, and low speed directional movement, and a cruise (also commonly referred to as airplane) mode (shown in FIG. 8B), which allows for forward flight as well as horizontal takeoff and landing. Aircraft 800 includes a fuselage 802, wing 804, and booms 806a, 806b, connected to the wing on opposite sides of the fuselage 802. In accordance with features of embodiments described herein, aircraft further includes three pairs of propulsion systems, including a first pair of boom-mounted propulsion systems 808a, 808b, a second pair of boom-mounted propulsion systems 810a, 810b, and a pair of wing-mounted propulsion systems 812a, 812b. In the illustrated embodiment, propulsion systems 812a, 812b, are tiltably connected to the leading edge of wing 804 at outboard ends thereof, while propulsion systems 808a, 808b, are tiltably connected to the forward end of booms 806a, 806b inboard of propulsion systems 812a, 812b. Alternatively, propulsion systems 808a, 808b, may be tiltably connected to the forward edge of wing 804 inboard of propulsion systems 812a, 812b. Propulsion systems 810a, 810b, are mounted to bottom surfaces of booms 806a, 806b, proximate the aft end or aft of the fuselage 802. Aircraft 800 further includes a tail assembly 813 at an aft end thereof.

Similar to the propulsion systems of aircraft 100, each of propulsion systems 808a, 808b, 810a, 810b, 812a, and 812b may include a drive system housing comprising a pylon, and a rotatable open rotor assembly comprising a plurality of rotor blades connected to a rotor mast and configured to rotate about a rotor axis. As shown in FIGS. 8A and 8B, the rotor assembly of each of propulsion systems 808a, 808b, 812a, 812b, includes five (5) rotor blades; however, it should be recognized that more or fewer blades may be implemented without departing from the spirit and the scope of the embodiments described. It should also be recognized that rotor assemblies of propulsion systems 808a, 808b, may include a different number of rotor blades than rotor assemblies of propulsion systems 812a, 812b. Rotation of rotor assemblies of propulsion systems 808a, 808b, 812a, and 812b generates lift while the aircraft 800 is operating in helicopter mode and thrust while the aircraft 800 is operating in airplane mode.

In the illustrated embodiment, each boom-mounted propulsion system 810a, 810b, includes a drive system housing comprising a pylon and a rotatable open rotor assembly comprising a plurality of rotor blades connected to a rotor mast and configured to rotate about a rotor axis. As shown in FIGS. 8A and 8B, each rotor assembly of propulsion systems 810a, 810b, includes two (2) rotor blades; however, it should be recognized that more or fewer blades may be implemented without departing from the spirit and the scope of the embodiments described. Rotation of rotor assemblies of propulsion systems 810a, 810b, generates lift while the aircraft 800 is operating in helicopter mode. It will be recognized that while rotor assemblies of propulsion systems 810a, 810b, are illustrated as being disposed below (i.e., on the underside of) booms 806a, 806b, they may alternatively be disposed above (i.e., on top of) booms.

In accordance with features of embodiments described herein, and as illustrated in FIGS. 8A and 8B, propulsion systems 808a, 808b, 812a, 812b, are tiltably connected to the wing 804 and tilt relative to wing between a first position (FIG. 8A), in which propulsion systems 808a, 808b, 812a, 812b, are configured in a hover mode, and a second position (FIG. 8B), in which propulsion systems 808a, 808b, 812a, 812b, are configured in a cruise mode. In accordance with features of embodiments described herein, aft propulsion systems 810a, 810b, are fixedly attached to booms 806a, 806*b*, aft of the wing 804 in hover mode and do not convert between hover mode (FIG. 8A) and cruise mode (FIG. 8B).

The position of rotor assemblies of propulsion systems 808*a*, 808*b*, 812*a*, 812*b*, as well as the pitch of individual rotor blades of all of the propulsion systems 808*a*, 808*b*, 810*a*, 810*b*, 812*a*, 812*b*, can be selectively controlled in order to selectively control direction, thrust, and lift of aircraft 800. As previously noted, propulsion systems 808*a*, 808*b*, 812*a*, 812*b*, are each convertible, relative to fuselage 802, between a vertical position, as shown in FIG. 8A, and a horizontal position, as shown in FIG. 8B. Propulsion systems 808*a*, 808*b*, 812*a*, 812*b*, are in the vertical position during vertical takeoff and landing mode. Vertical takeoff and landing mode may be considered to include hover operations of aircraft 800. Propulsion systems 808*a*, 808*b*, 812*a*, 812*b*, are in the horizontal position during forward flight mode, in which aircraft 800 is in forward flight. In forward flight mode, propulsion systems 808*a*, 808*b*, 812*a*, 812*b*, direct their respective thrusts in the aft direction to propel aircraft 800 forward. Aircraft 800 is operable to fly in all directions during the vertical takeoff and landing mode configuration of FIG. 8A, although faster forward flight is achievable while in the forward flight mode configuration of FIG. 8B. Propulsion systems 808*a*, 808*b*, 812*a*, 812*b*, may be tiltable between the vertical and horizontal positions by actuators (not shown) that are tiltable in response to commands originating from a pilot and/or a flight control system.

It should be noted that, although propulsion systems 808*a*, 808*b*, are shown and described as being tiltable between cruise and hover positions, those propulsion systems may be fixed in the hover positions, similarly to propulsion systems 810*a*, 810*b*.

In accordance with features of embodiments described herein, in certain embodiments, when aircraft 800 is in cruise mode, rotor assemblies of propulsion systems 810*a*, 810*b*, may cease rotation. In embodiments in which propulsion systems 808*a*, 808*b*, are also fixed (i.e., do not convert between hover and cruise modes), rotor assemblies thereof may also cease rotation when aircraft 800 is in cruise mode. For rotors fixed in a hover or horizontal position, stopping the rotor when in transition to cruise flight on the wing reduces power requirements not contributing to forward flight. Drag is reduced by stopping the rotor such that only the tip presents frontal area. Propulsive efficiency of the remaining rotors is increased as the remaining rotors blade loading increases in cruise in comparison to power lost as a function of rotating the blade.

Figure 8C:
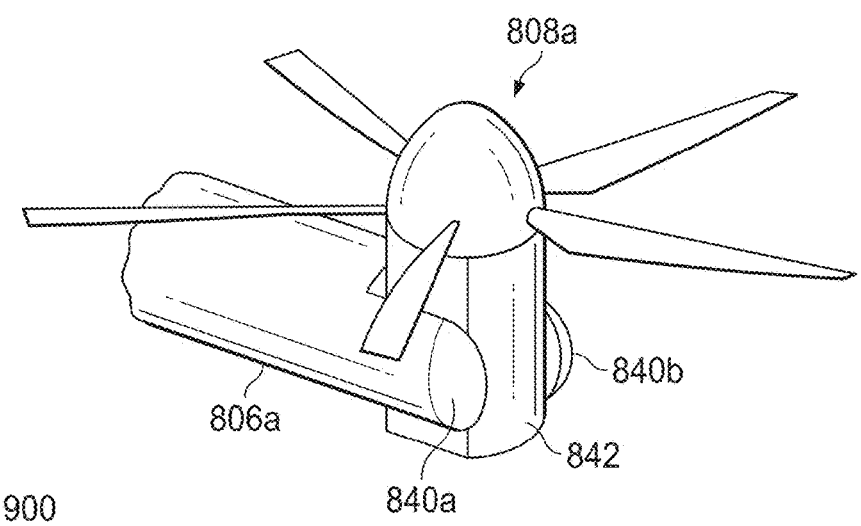
FIG. 8C illustrates additional details of a tilting propulsion assembly connection mechanism that may be deployed in alternative embodiments described herein such as illustrated in FIGS. 8A and 8B.

FIG. 8C illustrates in greater detail connection of one of forward propulsion systems of aircraft 800 (e.g., propulsion system 808*a*) to forward end of one of booms of aircraft 800 (e.g., boom 806*a*). In FIG. 8, pylon 806*a* includes two clevises 840*a*, 840*b*, that engage opposite sides of a pylon support spindle 842 in a manner that enables on a bearing surface between horizontal and vertical (as shown in FIG. 8C).

Figure 9:
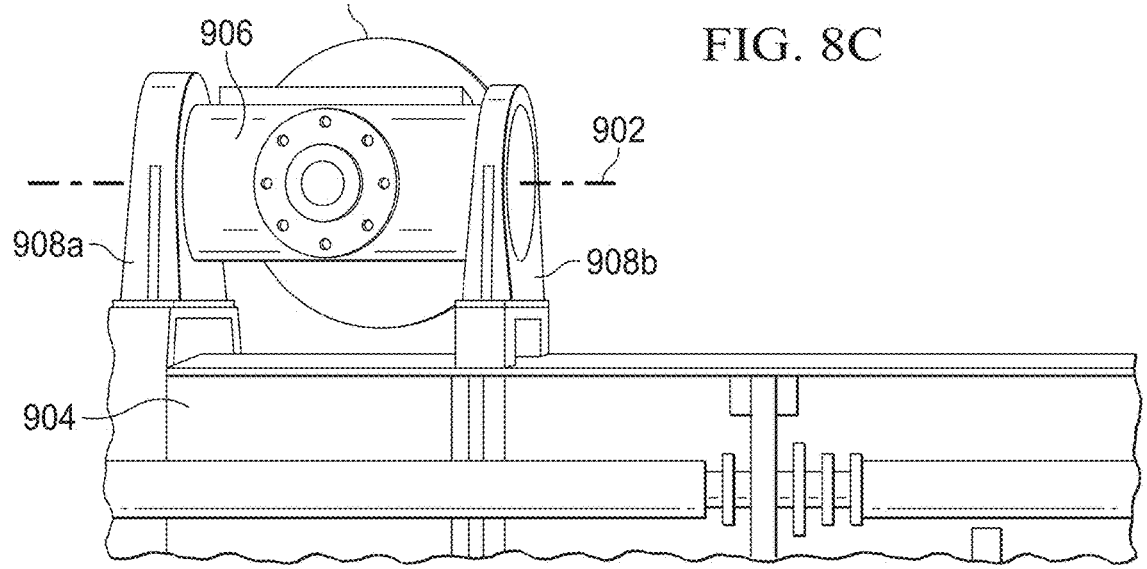
FIG. 9 illustrates additional details of pylon configuration where the rotor pylon and rotation point are elevated above the wing torque box.

FIG. 9 illustrates a pylon configuration in which a rotor pylon 900 and rotation axis 902 are elevated above the wing torque box 904. A pylon support spindle 906 is engaged on opposite sides thereof by bearing surface of clevises 908*a*, 908*b*. A linear actuator (not shown in FIG. 9) attached to a spindle (not shown in FIG. 9) in the wing torque box 904 and to the pylon support 906 actuates the pylon 900 between horizontal (as shown in FIG. 9) and vertical orientations.

Figure 10:
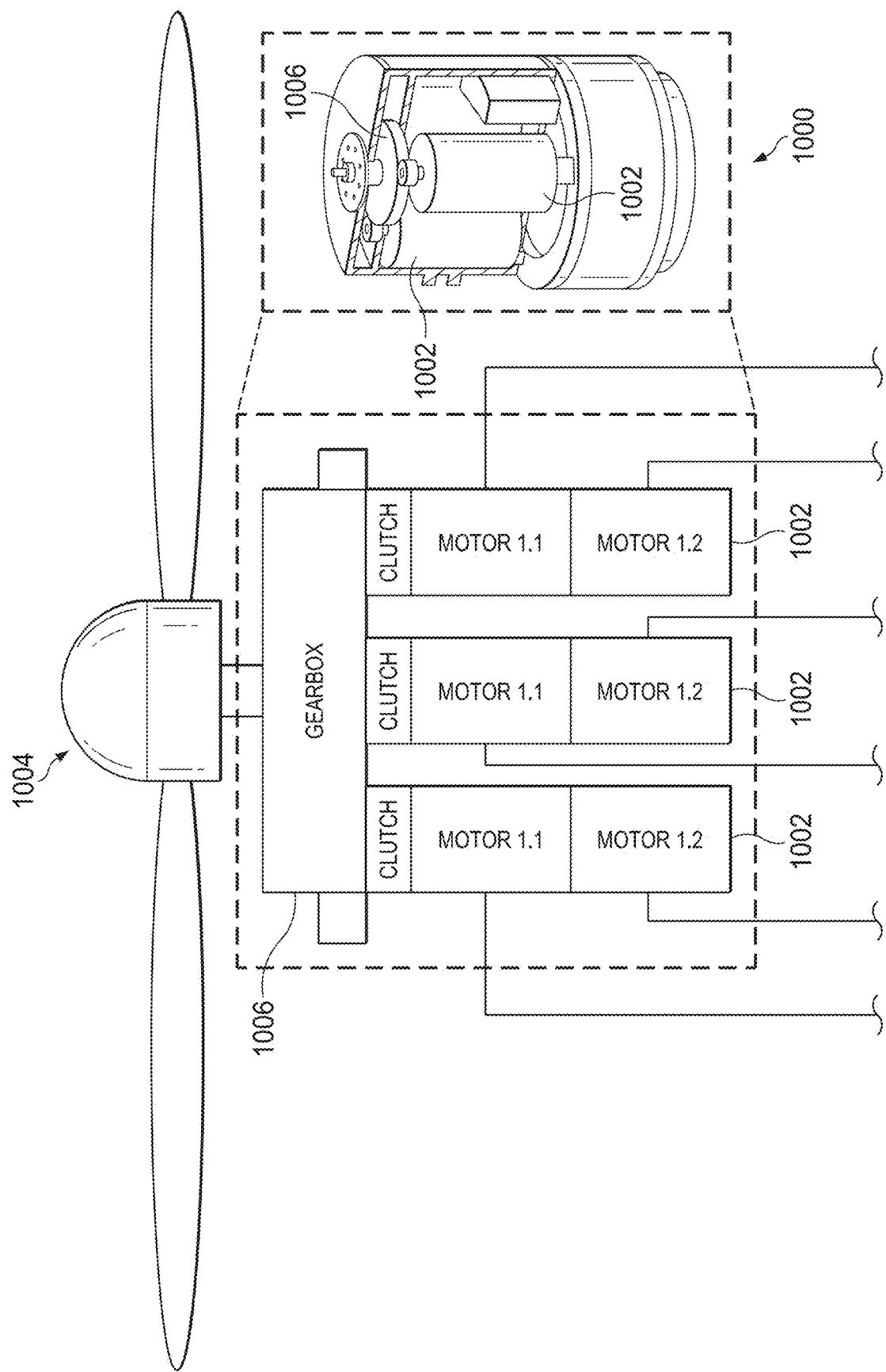
FIG. 10 illustrates a rotor assembly drive system in accordance with embodiments described herein.

FIG. 10 illustrates a drive system 1000 that may be deployed in any of the propulsion systems described hereinabove. As shown in FIG. 10 drive system 1000 includes multiple electric motors 1002 for providing rotational energy to a rotor assembly 1004 via a gearbox 1006.

Figure 11:
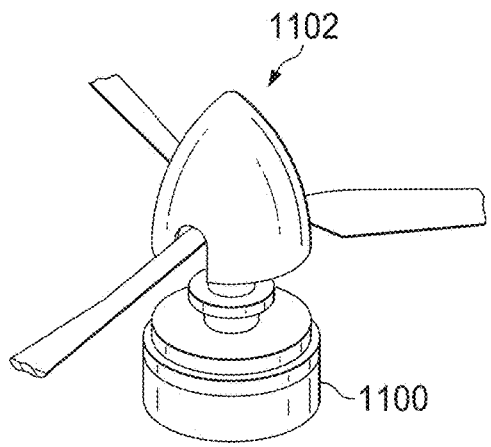
FIG. 11 illustrates a rotor assembly drive system in accordance with alternative embodiments described herein.

FIG. 11 illustrates a drive system 1100 that may be deployed in any of the propulsion systems described hereinabove. As shown in FIG. 11, drive system 1100 includes a single electrical motor for providing rotational energy to a rotor assembly 1102.

In accordance with features of embodiments described herein, the drive system (such as drive system 1000 or 1100) for a rotor assembly may tilt with the rotor assembly (e.g., located in a rotating pylon or in a rotating portion of a pylon) or may be fixed (i.e., non-tilting). In embodiments in which the drive system is fixed, the drive system may be located in a fixed portion of a partially tilting pylon, in which case a gearbox is used to allow transmittal across the rotation, or in the fuselage with a driveshaft down the wing. In certain embodiments, there may be a drive assembly in the pylon and a drive shaft and a group of motors disposed within the fuselage to allow redundancy with a reduced number of motors.

The electric tiltrotor configurations described herein are characterized by tilting of the rotors on a wing. The tiltrotor configurations described herein rotate the rotor pylon at the side pylon of body, at a wing station inboard on the wing, or by incorporating tiltwing elements with wing rotation as a whole. The degree of wing rotation with the pylon and placement of the axis of rotation relative to the wing may be customized depending on the embodiment. Additionally, the number of motors and the manner in which the motors are arranged in a rotating or fixed pylon or inboard in the fuselage with a drive shaft extending through the wing to the rotor assembly may also be customized depending on the embodiment. Pylon rotation may be actuated using one or more linear and/or rotary actuators located forward of, behind, or beneath the pylon depending on the embodiment.

Various tilting rotor pylon embodiments include embodiments in which the entire pylon and outboard of the pylon rotates, the entire pylon (and outboard) and a portion of the inboard wing structure rotates, the entire pylon and the entire wing structure rotates (i.e., tiltwing), and a portion of the pylon rotates either in line with the pylon or above the wing structure. Additionally, the electric motor or motors may be located in the rotating pylon, in a rotating portion of the pylon or a fixed portion of the pylon with a gearbox to allow transmittal across the rotation, and/or in the fuselage with a drive shaft down the wing and appropriate gearboxes for driving the rotor assembly. Additionally, one or more motors could be located in the pylon and one or more motors could also be located in the fuselage with a down-wing drive shaft to allow redundancy with a reduced number of motors.

Embodiments described herein support both flapping rotor and rigid rotor/prop pylon rotation. The pylon rotates about an axis within the wing or above the wing. In various embodiments, none of the wing structure, a portion of the wing structure, or all of the wing structure may rotate with the pylon. One or more motors for driving a combining gearbox to drive rotors may be arrayed in the rotor pylon or in the fuselage with or without an interconnect between rotors. Linear or rotary actuators may be used to implement pylon rotation.

Tilting portions offer a tradeoff between stalled wing in transition and a download in hover. Rotating the wing or a portion of the wing with the pylon increases the area of the wing seeing a high angle of attack and encountering stall versus additional download of a non-rotated wing in hover. A wing extension beyond the pylon increase cruise performance.

It should be appreciated that aircraft illustrated herein, such as aircraft 100, is merely illustrative of a variety of aircraft that can implement the embodiments disclosed herein. Indeed, the various embodiments of the electric drive system line replaceable unit described herein may be used on any aircraft that utilizes motors. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies described herein may comprise any materials suitable for use with an aircraft rotor. For example, rotor blades and other components may comprise carbon fiber, fiberglass, or aluminum; and rotor masts and other components may comprise steel or titanium.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An aircraft comprising:
   a fuselage;
   a wing connected to the fuselage; and
   a pair of booms connected to the wing on opposite sides of the fuselage;
   an aft pair of boom-mounted propulsion systems mounted proximate aft ends of booms;
   a forward pair of boom-mounted propulsion systems mounted to forward ends of booms; and
   a pair of wing-mounted propulsion systems mounted to the wing on opposite sides of the fuselage;
   wherein each of the propulsion systems includes pylon and a rotor assembly comprising a plurality of rotor blades; and
   wherein at least a portion of each of the forward pair of boom-mounted propulsion systems and the wing-mounted propulsion systems are tiltable between a first position in which the aircraft is in a hover mode and a second position in which the aircraft is in a cruise mode.

2. The aircraft of claim 1 wherein each of the wing-mounted propulsion systems comprises an electric motor located in a pylon of the wing-mounted propulsion system.

3. The aircraft of claim 1, wherein the aft pair of boom-mounted propulsion systems are fixedly attached in a hover mode.

4. The aircraft of claim 1, wherein a tilt angle of the aft pair of boom-mounted propulsion systems causes a component of a thrust from each of the aft pair of boom-mounted propulsion systems to provide a yaw moment.

5. The aircraft of claim 1, wherein the aft pair of boom-mounted propulsion systems are configured to cease rotation when the aircraft is in a cruise mode.

6. The aircraft of claim 5, wherein the aft pair of boom mounted propulsion systems each comprise a rotor assembly with two blades, and in the cruise mode the aircraft is configured to stop the rotor assembly of the aft pair of boom mounted propulsion systems with only a tip of the blades presenting a frontal area.

7. The aircraft of claim 1, wherein the aft pair of boom-mounted propulsion systems is mounted on a top surface of the pair of booms.

8. The aircraft of claim 1, wherein each of the forward pair of boom-mounted propulsion systems is rotatably mounted on the forward ends of the pair of booms.

9. The aircraft of claim 1, further comprising a tail assembly connected proximate aft ends of the booms aft of the aft pair of boom-mounted propulsion systems.

10. The aircraft of claim 1, wherein the wing comprises winglets.

11. The aircraft of claim 1, wherein the aircraft is an unmanned aircraft.

12. An aircraft comprising:
    a fuselage;
    a wing connected to the fuselage; and
    a pair of booms connected to the wing on opposite sides of the fuselage;
    an aft pair of boom-mounted propulsion systems fixedly mounted proximate aft ends of booms, wherein the aft pair of boom-mounted propulsion systems are fixedly attached in a hover mode and cease rotation when the aircraft is in a cruise mode;
    a forward pair of boom-mounted propulsion systems rotatably mounted to forward ends of booms;
    a pair of wing-mounted propulsion systems rotatably mounted to the wing on opposite sides of the fuselage; and
    a tail assembly connected proximate aft ends of the booms aft of the aft pair of boom-mounted propulsion systems,
    wherein each of the propulsion systems includes pylon and a rotor assembly comprising a plurality of rotor blades;
    wherein at least a portion of each of the forward pair of boom-mounted propulsion systems and the wing-mounted propulsion systems are tiltable between a first position in which the aircraft is in a hover mode and a second position in which the aircraft is in a cruise mode.

13. The aircraft of claim 12 wherein each of the wing-mounted propulsion systems comprises an electric motor located in a pylon of the wing-mounted propulsion system.

14. The aircraft of claim 12, wherein the aft pair of boom mounted propulsion systems each comprise a rotor assembly including two rotor blades, and in the cruise mode the aircraft is configured to stop the rotor assembly of the aft pair of boom mounted propulsion systems with only a tip of the blades presenting a frontal area.

15. The aircraft of claim 12, wherein the aft pair of boom-mounted propulsion systems is mounted on a top surface of the pair of booms.

16. An aircraft comprising:
    a fuselage;
    a wing connected to the fuselage;
    first and second booms connected to the wing on opposite sides of the fuselage; and
    three pairs of propulsion systems comprising:
       an aft pair of propulsion systems fixedly mounted to the aircraft aft of the wing on opposite sides of the fuselage;
       a forward pair of boom-mounted propulsion systems rotatably mounted to the first and second booms forward of the wing on opposite sides of the fuselage; and
       a pair of wing-mounted propulsion systems rotatably mounted to the wing on opposite sides of the fuselage;
    wherein each of the propulsion systems includes pylon and a rotor assembly comprising a plurality of rotor blades;
    wherein at least a portion of each of the forward pair of propulsion systems and the wing-mounted propulsion systems are tiltable between a first position in which the aircraft is in a hover mode and a second position in which the aircraft is in a cruise mode.

17. The aircraft of claim 16 wherein each of the wing-mounted propulsion systems comprises an electric motor located in a pylon of the wing-mounted propulsion system.

18. The aircraft of claim 16, wherein the aft pair of propulsion systems are fixedly attached in a hover mode.

19. The aircraft of claim 16, wherein a tilt angle of the aft pair of propulsion systems causes a component of a thrust from each of the aft pair of propulsion systems to provide a yaw moment.

20. The aircraft of claim 16, wherein the aft pair of propulsion systems are configured to cease rotation when the aircraft is in a cruise mode.

\* \* \* \* \*